United States Patent
Koenig et al.

(10) Patent No.: US 7,233,479 B2
(45) Date of Patent: Jun. 19, 2007

(54) DEVICE FOR PROTECTING A BATTERY FROM ELECTROSTATIC CHARGING

(75) Inventors: Jochen Koenig, Sindelfingen (DE); Peter Schlichenmaier, Wendlingen (DE)

(73) Assignee: DaimlerChrysler AG, Stuttgart (DE)

( * ) Notice: Subject to any disclaimer, the term of this patent is extended or adjusted under 35 U.S.C. 154(b) by 724 days.

(21) Appl. No.: 10/406,231

(22) PCT Filed: Sep. 29, 2001

(86) PCT No.: PCT/EP01/11278

§ 371 (c)(1),
(2), (4) Date: Jun. 11, 2003

(87) PCT Pub. No.: WO02/31899

PCT Pub. Date: Apr. 18, 2002

(65) Prior Publication Data

US 2004/0196611 A1    Oct. 7, 2004

(30) Foreign Application Priority Data

Oct. 6, 2000    (DE) ................................ 100 49 455

(51) Int. Cl.
   *H02H 1/00* (2006.01)
(52) U.S. Cl. .................................... 361/212
(58) Field of Classification Search ............. 361/212
   See application file for complete search history.

(56) References Cited

U.S. PATENT DOCUMENTS 3,522,105 A * 7/1970 Sabatino ............... 429/182
4,888,243 A * 12/1989 Jonas et al. ............ 428/411.1
5,237,009 A * 8/1993 Lee ........................ 525/187
5,534,364 A * 7/1996 Watanabe et al. ........ 429/61
5,560,753 A * 10/1996 Schnabel et al. .......... 51/295
5,916,506 A * 6/1999 Breznak et al. .......... 264/104
5,958,303 A * 9/1999 Narkis et al. ............ 252/511
6,248,262 B1 * 6/2001 Kubotera et al. ......... 252/511

(Continued)

FOREIGN PATENT DOCUMENTS

DE    2157290    6/1972

(Continued)

OTHER PUBLICATIONS

International Search Report.

*Primary Examiner*—Ronald Leja
(74) *Attorney, Agent, or Firm*—Crowell & Moring LLP

(57) ABSTRACT

The invention relates to a device for protecting a battery from electrostatic charging. In particular, the invention is directed to an electrically conductive covering for a vehicle battery having a plastic casing. The type of plastics typically used in casings for vehicle batteries have a tendency to develop electrostatic charges. The accumulation of such charges can result in flash overs that can damage the battery and, in certain circumstances, can result in explosions. The covering may be a film having a surface resistance of $<1 \cdot 10^9$ ohms that is connected to one of the terminals of the battery, thus draining the electrostatic charges that might otherwise build up. The covering may be provided with various features, including ribbing that preserves the structural integrity of the covering as well as different structures to hold down the covering on the battery. The covering is designed so that it can be customized to fit various battery types and sizes and is also reusable.

22 Claims, 2 Drawing Sheets

U.S. PATENT DOCUMENTS 6,540,945 B2 * 4/2003 Kubotera et al. ........... 252/511
6,636,015 B1 * 10/2003 Levine et al. .............. 320/105
6,657,005 B1 * 12/2003 Nishihata et al. ............ 525/64
7,086,283 B2 * 8/2006 Koyano et al. ............... 73/431

FOREIGN PATENT DOCUMENTS

| DE | 3725575 | A1 | | 2/1989 |
| DE | 4141989 | A1 | | 6/1993 |
| DE | 19832929 | C1 | | 1/2000 |
| GB | 2087637 | A | * | 5/1982 |
| JP | 57121147 | A | * | 7/1982 |
| JP | 4-101353 | | | 4/1992 |
| JP | 04264355 | A | * | 9/1992 |
| JP | 05062657 | A | * | 3/1993 |
| JP | 06192471 | A | * | 7/1994 |

* cited by examiner

DEVICE FOR PROTECTING A BATTERY FROM ELECTROSTATIC CHARGING

BACKGROUND AND SUMMARY OF THE INVENTION

This application claims the priority of Application No. 100 49 455.2, filed Oct. 6, 2000, in Germany, and PCT/EP01/11278, filed Sep. 29, 2001, the disclosures of which are expressly incorporated by reference herein.

The invention relates to a device for protecting a battery from electrostatic charging, in particular a vehicle battery, the battery having a plastic casing and a surface which is provided with a film having a surface resistance of $<1 \cdot 10^9$ ohms.

Vehicles with internal combustion engines usually have multi-cell lead-acid batteries, in which the individual galvanic cells are arranged in a common casing or battery container. For technical production-related reasons and due to cost considerations, this casing (referred to hereafter as plastic casing) is produced from injection moldable plastics, in particular polypropylene, acrylonitrile-butadiene-styrene or acrylate copolymers. However, plastics have a notorious tendency to easily develop static charges, since charge separations produced on the surface by friction are equalized only very slowly and often are equalized spontaneously by flashover or brush discharges.

In combination with the generation of detonating gas typical of lead-acid storage batteries when the battery is overloaded, the static discharge caused by flashover can lead to the detonating gas mixture being ignited and the battery being destroyed as a result. Employees of service stations working on battery recharging or battery maintenance are affected in particular in such cases. Battery explosions spontaneously occurring in the vehicle also lead not only to failure of the electrical supply of the vehicle but often also to damage on account of released sulfuric acid.

To avoid or reduce such damage, German Patent Documents DE-A 21 57 290 or DE-A 37 25 575, for example, disclose plastic casings with antistatic properties, which reduce or entirely avoid electrostatic charging of the plastic or battery casing.

To avoid electrostatic charging of the battery, German Patent Document DE 198 32 929 C1, for example, discloses an adhesive film which is connected in a galvanically conducting manner to the negative pole of the battery and binds water molecules. A disadvantage of this is that the adhesive film is fixedly applied to the surface of the battery and consequently cannot be exchanged. Rather, an adhesive film of this type can only be used once. In addition, to achieve the surface resistance of $<1 \cdot 10^9$ ohms (guideline of the Hauptverband der gewerblichen Berufsgenossenschaften "Statische Elektrizität" German confederation of industrial employers' liability insurance associations on "static electricity", 4th edition, 1980, page 10), it must be ensured that the material of the film is suitable for bonding a sufficient number of water molecules. For dissipating the electrostatic charge, a metallic connection contact is also provided.

The invention is therefore based on the object of specifying a device for protecting a battery from electrostatic charging that is of a particularly simple configuration and is suitable for repeated use and for known plastic casings without modification of these casings.

The object is achieved according to the invention by a device for protecting a battery from electrostatic charging, the battery having a plastic casing and a surface that is provided with a film which has having a surface resistance of $<1 \cdot 10^9$ ohms, the film being electrically conductive and arranged detachably and flush with the edges on the surface of the battery. An electrically conductive film of this type flexibly applied to the surface and having a surface resistance of $<1 \cdot 10^9$ ohms provides particularly reliable avoidance of electrostatic charging of the battery. In particular, a charge separation caused by friction, which may leads to a spark discharge of the battery, which in turn may lead to the latter exploding, is reliably avoided.

The film may be formed from a polymeric material that is provided with an electrically conductive substance. The conductive substance is preferably graphite, a metal or an organic semiconductor. By use of internal antistatic agents for the film, the film is suitable for dissipating the electrostatic charge, for example, the charge separation caused by friction. It is consequently possible to dispense with metallic contact elements known from the prior art for dissipation, on account of the electrically conducting nature of the film. In addition, the film is made to be permanently antistatic by incorporation of additives with electronic conductivity such as graphite or metals, for example aluminium aluminum. In contrast, the water-binding film known from the prior art it always has to be must have a sufficiently large number of water molecules bonded to achieve the predetermined surface resistance in the film substance, such a film of solid material is not of a particularly flexible configuration.

A preferred arrangement of the film is flush with the edges on the battery surfaces the film may be cut to size in the manner of a fabric to ensure this arrangement. The film may be advantageously adapted to the dimensions of the surface of the battery. This makes it possible for the device to be used for protecting any type of battery from electrostatic charging by cutting the film to size according to the dimensions of the respective battery surface. For largely covering the entire battery surface, the film may have reinforcing ribs for shaping it, which reliably avoid rolling together or folding over of the particularly flexible film. In addition or alternatively, the film may be arranged in a frame opening of a profile frame.

For the electrically conducting of the film with the negative pole, a hold-down device may be provided for pressing the film onto the surface. For fastening the hold-down device, the film may have at least one clearance. In a particularly simple configuration, the clearance may be a hole punched into the film. Depending on the configuration of the hold-down device, one or more clearances may be provided. The hold-down device preferably has at least one cylindrical pin, which is expediently arranged in the clearance of the film and at least one fastening hole of for the battery, in particular in what is known as a blind hole for customary coverage of the negative pole. Depending on the specification, the hold-down device may be designed as a T-profile or in a spiral form. It is possible to dispense with the usual coverage of the negative or positive pole of the battery (known as pole caps) on account of the largely complete coverage of the battery surface by means of the film. To identify the negative and positive poles, the film advantageously has appropriate coloring in the region of the negative and/or positive pole, for example red or blue coloring.

For particularly secure holding-down of the film and contacting of the film with the negative pole, the hold-down device may be formed from a solid material, for examples solid plastic. In addition, the hold-down device may have an angle of inclination. This ensures that the film arranged between the hold-down device and the negative pole is pressed onto the negative pole as a result of the arrangement of the hold-down device in the direct vicinity of the negative pole and on account of its curvature. Such a film resting with pressure on the negative pole provides particularly good electrical contact for dissipating the electrostatic charges.

DETAILED DESCRIPTION OF THE INVENTION

Figure 1:
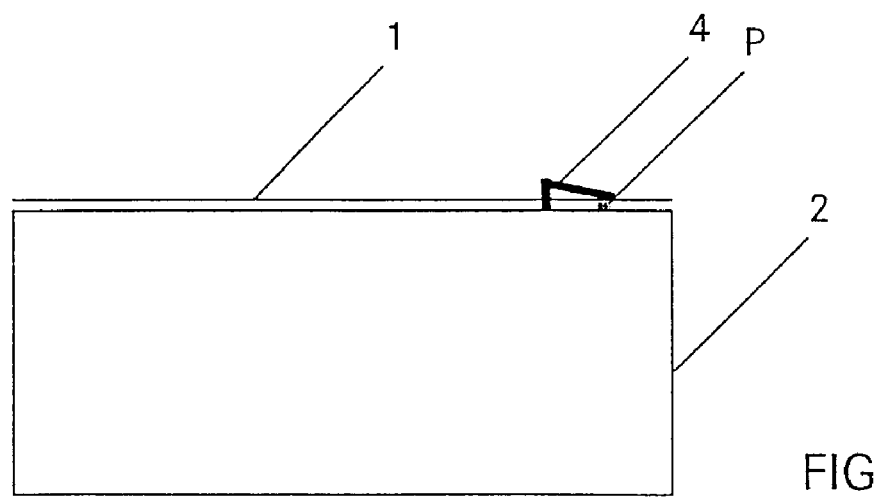
FIG. 1 illustrates in side view a battery with a film detachably arranged on the surface.

Parts corresponding to one another are provided with the same reference numerals in each of the figures.

FIG. 1 illustrates a side view of a film 1, which is detachably arranged on a battery 2, in particular a vehicle battery. The film 1 is preferably made of electrically conductive material and completely covers the battery surface. Preferably provided as the electrically conductive material for the film 1 is a polymeric material, for example, polyethylene or PVC, which is provided with an electrically conductive substance. The conductive substance may be graphite, a metal, for example, aluminum, or an organic semiconductor. The film 1 may be of a particularly flexible configuration. The film 1 may be cut to size in the manner of a fabric and may consequently be adapted to any desired type of battery, in particular to the dimensions of the respective battery surface; for example the film may be cut to be flush with the edges. For pressing the film 1 onto the battery surface, in particular onto one of the poles P, for example, the negative pole, of the battery 2, a hold-down device 4 is provided. Depending on the type and configuration of the battery 2 to be covered, the hold-down device 4 is arranged in the region of the negative pole for pressing down the film 1 and, in particular, for its reliable contacting with the negative pole. Dissipation of the electrostatic charge by means of the film 1 contacting the negative pole or the positive pole is made possible as a result.

Figure 2:
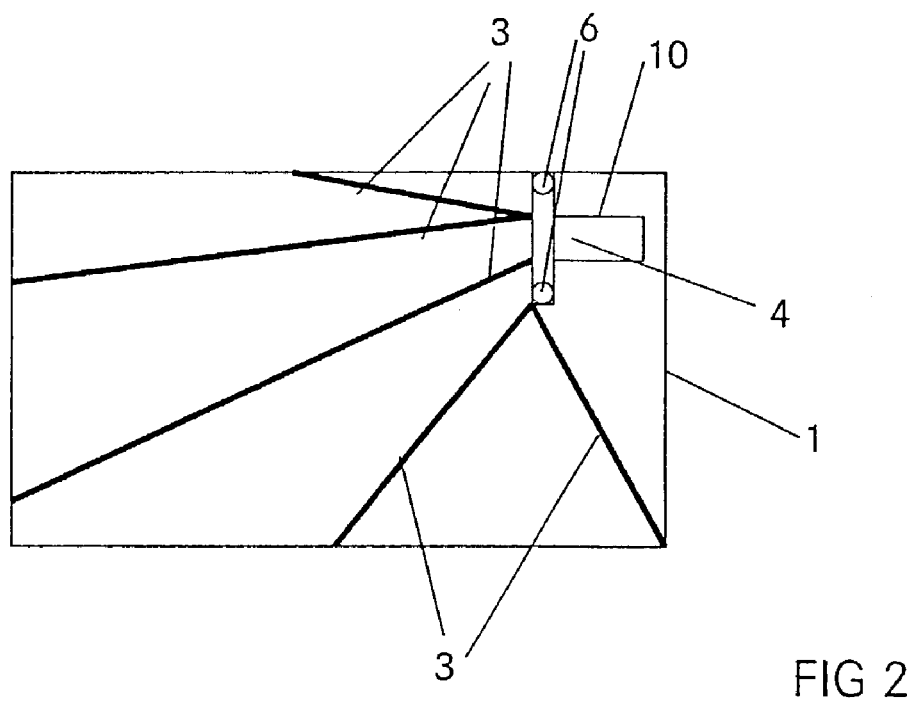
FIG. 2 illustrates a plan view of the battery according to FIG. 1.

In FIG. 2, the film 1 is represented in plan view. The film 1 may be provided with a predetermined number of reinforcing ribs 3 for the shaping of the film 1. This avoids rolling together or folding over of the film 1. The reinforcing ribs 3 may be configured, for example, as plastic strips, which are, for example, injection molded on or adhesively bonded on. Depending on the type and size of the battery surface to be covered by the film 1, the film can alternatively or additionally be used in an opening of a profile frame. This provides shaping of the film 1 for the reliable coverage of the battery surface.

For secure fitting of the film 1 on the battery surface, the hold-down device 4 may be arranged in at least one clearance 6 of the film 1 and in a fastening hole (not represented) of the negative pole. At least one of the blind holes, as they are known, of the battery 2, which are usually provided for receiving the pole caps, as they are known (in accordance with DIN EN 60095-1), serves as the fastening hole of the negative pole. The clearance 6 is, for example, a hole punched into the film 1. The hole is in this case punched into the film 1 in a way corresponding to the position of the blind hole of the negative pole on the battery surface of the respective type of battery.

Figure 3:
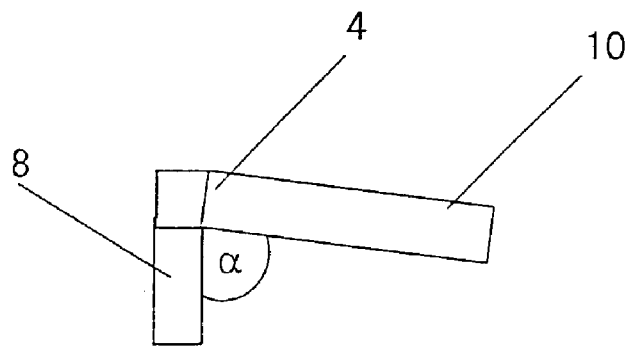
FIG. 3 illustrates a hold-down device for arranging the film according to FIG. 1.

In FIG. 3, the hold-down device 4 is schematically represented in side view. For secure holding of the hold-down device 4 in the fastening hole, a corresponding pin 8 may be provided. The pin 8 is inserted into the provided clearance 6 of the film 1 and arranged in the fastening hole. For particularly reliable electrical contact of the film 1 with the negative pole of the battery 2, the hold-down device 4 may be of a curved configuration. The hold-down device 4 is formed from plastic. For example, the hold-down device 4 is configured as a T-profile, with contact element 10, arranged towards the negative pole, having an angle of inclination $\alpha$. A hold-down device 4 curved towards the battery surface and having the angle of inclination $\alpha$ has the effect that the film 1 lies with pressure on one of the poles P, the negative pole or the positive pole, or on the respective pole terminal.

Figure 4:
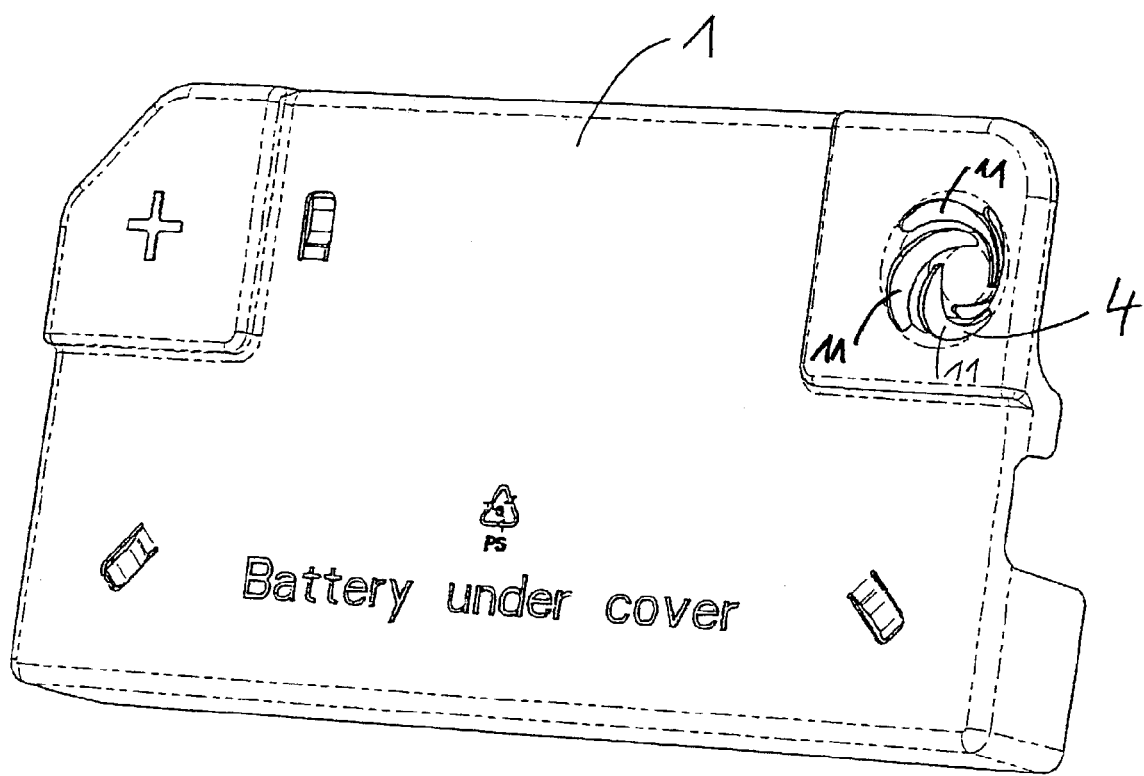
FIG. 4 illustrates a plan view of the film with a spiral hold-down device.

FIG. 4 illustrates an alternative embodiment of the hold-down device 4. In this case, the hold-down device 4 may be configured in a spiral form. In this case, for reliable contacting of the film 1 with the negative pole of the battery 2, the spiral hold-down device 4 may be guided and held on the thread of the negative pole. Depending on the specification, the spiral hold-down device 4 is configured in one or more parts. FIG. 4 illustrates a multi-part spiral 11, which is arranged around one of the poles, in particular, the negative pole. Particularly simple and secure retention and contacting of the film 1 with the negative pole of the battery 2 is made possible as a result. In addition, simple and quick mounting of the film 1 onto the battery 2 without any aids is made possible by the spiral form. Furthermore, with a spiral hold-down device 4 of this type, the film 1 can be retrofitted on already existing batteries 2.

For identifying the negative and/or positive pole, the film 1 has, in a way not represented in any more detail, appropriate coloring in the region of the two poles P. The advantages of the flexible film 1 described, which is detachably arranged on the battery surface by means of the hold-down device 4, is that it can be exchanged and consequently can be reused. In addition, on account of its properties, the film 1 can be cut to size for any desired type of battery. Furthermore, on account of the additives with electrical conductivity incorporated in the film material, electrostatic charging of the battery 2 having a plastic casing is reliably avoided. The film 1 can also be produced at particularly low cost. On account of the properties of the film 1, it is possible to dispense with additional elements, for example metallic contact strips to the negative pole, for dissipating the electrostatic charging. Consequently, the device in the form of a film 1 for protecting from electrostatic charging is of a particularly simple configuration, as a result of which particularly simple production and handling is possible.

The invention claimed is:

1. A device for protecting a battery from electrostatic charging, said battery having a plastic casing and a surface which is provided with a film having a surface resistance of $<1 \cdot 10^9$ ohms, wherein the film is electrically conductive and arranged detachably and flush with edges on the surface of the battery.

2. The device according to claim 1, wherein the film is formed from a polymeric material which is provided with an electrically conductive substance.

3. The device according to claim 2, wherein the conductive substance is graphite, a metal or an organic semiconductor.

4. The device according to claim 1, wherein the film is configured with reinforcing ribs.

5. The device according to claim 1, wherein the film has at least one clearance for fastening.

6. The device according to claim 1, wherein a hold-down device is provided for pressing the film onto the surface for the electrically conducting contacting of the film with respect to a pole of the battery.

7. The device according to claim 6, wherein the hold-down device is arranged in the clearance of the film and in a fastening hole of the battery.

8. The device according to claim 6, wherein the hold-down device is formed from a solid material as a T-element and has an angle of inclination.

9. The device according to claim 6, wherein the hold-down device is formed from a solid material in a spiral form.

10. The device according to claim 1, wherein the film has a predeterminable coloring in the region of a negative pole and/or a positive pole.

11. The device according to claim 1, wherein the film is adapted to dimensions of the surface of the battery.

12. An apparatus for protecting a battery having a plastic casing and a surface from electrostatic charging, comprising:
a film having a resistance of $<1 \cdot 10^9$ ohms;
wherein said film is arranged detachably and flush with edges on said surface of said battery.

13. The apparatus of claim 12, wherein said film comprises a polymeric material provided with an electrically conductive substance.

14. The apparatus of claim 13, wherein said conductive substance comprises at least one of graphite, a metal, and an organic semiconductor.

15. The apparatus of claim 12, wherein said film comprises reinforcing ribs.

16. The apparatus of claim 12, wherein said film comprises at least one clearance for fastening.

17. The apparatus of claim 12, further comprising:
a hold-down device, wherein said hold-down device is provided for pressing said film onto said surface for electrically contacting said film to a pole of said battery.

18. The apparatus of claim 17, wherein said hold-down device is arranged in a clearance of said film and in a fastening hole of said battery.

19. The apparatus of claim 17, wherein said hold-down device is formed from a solid material as a T-element and has an angle of inclination.

20. The apparatus of claim 17, wherein said hold-down device is formed from a solid material in a spiral form.

21. The apparatus of claim 12, wherein said film has a color in a region of a negative pole or a positive pole of said battery.

22. The apparatus of claim 12, wherein said film is adapted to dimensions of said battery.

* * * * *